US012439399B2

United States Patent
Cha et al.

(10) Patent No.: US 12,439,399 B2
(45) Date of Patent: Oct. 7, 2025

(54) CONFIGURATION REQUEST IN WIRELESS COMMUNICATIONS

(71) Applicant: LG Electronics Inc., Seoul (KR)

(72) Inventors: Han Cha, Seoul (KR); Sunghoon Jung, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 17/990,182

(22) Filed: Nov. 18, 2022

(65) Prior Publication Data

US 2023/0224890 A1    Jul. 13, 2023

Related U.S. Application Data

(60) Provisional application No. 63/298,179, filed on Jan. 10, 2022.

(51) Int. Cl.
*H04W 72/12* (2023.01)
*H04W 76/15* (2018.01)
*H04W 88/06* (2009.01)

(52) U.S. Cl.
CPC ....... *H04W 72/1215* (2013.01); *H04W 76/15* (2018.02); *H04W 88/06* (2013.01)

(58) Field of Classification Search
CPC ... H04W 72/569; H04W 24/10; H04W 48/10; H04W 36/0088; H04W 36/302; H04W 24/00
USPC ..... 455/500, 561, 456.1, 425, 437; 370/241, 370/252, 335, 254, 332
See application file for complete search history.

(56) References Cited

U.S. PATENT DOCUMENTS

| 7,460,502 B2 * | 12/2008 | Arima ................ H04W 72/569 370/335 |
| 8,391,244 B2 * | 3/2013 | Choi ................ H04W 36/0088 370/332 |
| 8,467,300 B2 * | 6/2013 | Rune ..................... H04W 48/10 370/241 |
| 8,588,800 B2 * | 11/2013 | Iwamura ............ H04W 36/302 455/425 |

(Continued)

FOREIGN PATENT DOCUMENTS

| WO | WO-2021060893 A1 * | 4/2021 | ............ H04W 48/16 |
| WO | WO-2024232651 A1 * | 11/2024 | ............ H04W 24/08 |

OTHER PUBLICATIONS

E. Gures, I. Shayea, A. Alhammadi, M. Ergen and H. Mohamad, "A Comprehensive Survey on Mobility Management in 5G Heterogeneous Networks: Architectures, Challenges and Solutions," in IEEE Access, vol. 8, pp. 195883-195913, 2020, doi: 10.1109/ACCESS. 2020.3030762 (Year: 2020).*

(Continued)

*Primary Examiner* — William D Cumming
(74) *Attorney, Agent, or Firm* — Fish & Richardson P.C.

(57) ABSTRACT

A method and apparatus related to a configuration request in wireless communications. A multi-universal subscriber identity module (MUSIM) user equipment (UE) may request candidate MUSIM gaps, and indicate priority information for the candidate MUSIM gaps along with the request. Therefore, the UE can prevent the inefficient gap configuration regarding the second network operation even when the first network is unable to configure all requested gaps.

13 Claims, 13 Drawing Sheets

(56) References Cited

U.S. PATENT DOCUMENTS

| | | | | |
|---|---|---|---|---|
| 8,873,522 | B2* | 10/2014 | Meylan | H04W 24/10 |
| | | | | 455/437 |
| 9,019,860 | B2* | 4/2015 | Cheng | H04W 28/06 |
| | | | | 370/332 |
| 9,445,339 | B2* | 9/2016 | Axmon | H04W 36/302 |
| 10,693,523 | B2* | 6/2020 | Kim | H04L 5/10 |
| 10,911,097 | B2* | 2/2021 | Kim | H04L 5/0012 |
| 11,228,899 | B2* | 1/2022 | Ou | H04W 8/08 |
| 11,924,746 | B2* | 3/2024 | Chun | H04W 48/08 |
| 11,997,752 | B2* | 5/2024 | Ou | H04W 24/08 |
| 12,133,104 | B2* | 10/2024 | Guo | H04W 72/56 |
| 12,184,599 | B1* | 12/2024 | Jones, Jr. | H04L 51/214 |
| 12,207,321 | B2* | 1/2025 | Freda | H04W 76/27 |
| 2004/0092290 | A1* | 5/2004 | Arima | H04W 72/569 |
| | | | | 455/500 |
| 2010/0034158 | A1* | 2/2010 | Meylan | H04W 24/10 |
| | | | | 370/252 |
| 2010/0113055 | A1* | 5/2010 | Iwamura | H04W 24/10 |
| | | | | 455/561 |
| 2010/0159950 | A1* | 6/2010 | Toh | H04J 11/0086 |
| | | | | 455/456.1 |
| 2010/0214955 | A1* | 8/2010 | Rune | H04W 48/10 |
| | | | | 370/254 |
| 2010/0309803 | A1* | 12/2010 | Toh | H04W 36/0088 |
| | | | | 370/252 |
| 2013/0094393 | A1* | 4/2013 | Cheng | H04W 24/00 |
| | | | | 370/252 |
| 2016/0212609 | A1* | 7/2016 | Fujishiro | H04W 76/14 |
| 2018/0324619 | A1* | 11/2018 | Harada | H04W 24/10 |
| 2019/0222254 | A1* | 7/2019 | Kim | H04L 5/10 |
| 2020/0007280 | A1* | 1/2020 | Kim | H04L 5/0012 |
| 2020/0396591 | A1* | 12/2020 | Ou | H04W 76/30 |
| 2021/0352575 | A1* | 11/2021 | Chun | H04W 48/08 |
| 2022/0014957 | A1* | 1/2022 | Guo | H04B 7/0626 |
| 2022/0104001 | A1* | 3/2022 | Ou | H04W 8/183 |
| 2022/0369211 | A1* | 11/2022 | Agiwal | H04W 68/02 |
| 2023/0224890 | A1* | 7/2023 | Cha | H04W 76/28 |
| | | | | 370/329 |
| 2023/0262446 | A1* | 8/2023 | Kim | H04W 76/28 |
| | | | | 455/422.1 |
| 2024/0073989 | A1* | 2/2024 | Back | H04W 68/02 |
| 2024/0163934 | A1* | 5/2024 | Freda | H04W 68/02 |
| 2024/0214988 | A1* | 6/2024 | Shrivastava | H04W 76/27 |
| 2024/0236944 | A1* | 7/2024 | Jiang | H04W 76/30 |
| 2024/0236945 | A1* | 7/2024 | Kim | H04W 68/005 |
| 2024/0267837 | A1* | 8/2024 | Liu | H04W 28/02 |
| 2024/0334503 | A1* | 10/2024 | Freda | H04W 76/27 |
| 2025/0105958 | A1* | 3/2025 | Jung | H04W 72/231 |

OTHER PUBLICATIONS

3GPP, "3rd Generation Partnership Project; Technical Specification Group Services and System Aspects; Study on system enablers for devices having multiple Universal Subscriber Identity Modules (USIM) (Release 17)," TR 23.761 V17.0.0, Jun. 2021, 111 pages.

3GPP, "3rd Generation Partnership Project; Technical Specification Group Radio Access Network; NR; User Equipment (UE) procedures in Idle mode and RRC Inactive state (Release 16)," TS 38.304 V16.5.0, Jun. 2021, 39 pages.

3GPP, "3rd Generation Partnership Project; Technical Specification Group Radio Access Network; NR; Radio Resource Control (RRC) protocol specification (Release 16)," TS 38.331 V16.5.0, Jun. 2021, 959 pages.

Vivo et al., "New WID: Support for Multi-SIM devices in Rel-17," RP-193263 (revision of RP-193250), Presented at 3GPP TSG RAN Meeting #86, Sitges, Spain, Dec. 9-12, 2019, 5 pages.

* cited by examiner

CONFIGURATION REQUEST IN WIRELESS COMMUNICATIONS

CROSS-REFERENCE TO RELATED APPLICATIONS

This application claims the benefit of U.S. Provisional Application No. 63/298,179, filed on Jan. 10, 2022, the contents of which are all hereby incorporated by reference herein in their entirety

TECHNICAL FIELD

The present disclosure relates to a configuration request in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, a user equipment (UE) may request a configuration to a network. The network may configure the UE according to the UE's request, or make its own configuration based on the UE's request. This kind of configuration request may be performed in various operations, for example in a multi-universal subscriber identity module (MUSIM) operation.

SUMMARY

An aspect of the present disclosure is to provide method and apparatus for a configuration request in a wireless communication system.

Another aspect of the present disclosure is to provide method and apparatus for a configuration request in a MUSIM operation in a wireless communication system.

According to an embodiment of the present disclosure, a method performed by a user equipment (UE) in a wireless communication system comprises: registering to both a first network and a second network; establishing a connection with the first network; transmitting, to the first network, gap information related to one or more gaps requested by the UE and priority information for the one or more gaps, wherein the one or more gaps comprise a time period during which the UE pauses the connection with the first network for performing operations in the second network; receiving, from the first network, a configuration of at least one gap after transmitting the priority information to the first network; and performing operations in the second network during the at least one gap.

According to an embodiment of the present disclosure, a user equipment (UE) configured to operate in a wireless communication system comprises: at least one transceiver; at least processor; and at least one computer memory operably connectable to the at least one processor and storing instructions that, based on being executed by the at least one processor, perform operations comprising: registering to both a first network and a second network; establishing a connection with the first network; transmitting, to the first network, gap information related to one or more gaps requested by the UE and priority information for the one or more gaps, wherein the one or more gaps comprise a time period during which the UE pauses the connection with the first network for performing operations in the second network; receiving, from the first network, a configuration of at least one gap after transmitting the priority information to the first network; and performing operations in the second network during the at least one gap.

According to an embodiment of the present disclosure, at least one computer readable medium (CRM) stores instructions that, based on being executed by at least one processor, perform operations comprising: registering to both a first network and a second network; establishing a connection with the first network; transmitting, to the first network, gap information related to one or more gaps requested by the UE and priority information for the one or more gaps, wherein the one or more gaps comprise a time period during which the UE pauses the connection with the first network for performing operations in the second network; receiving, from the first network, a configuration of at least one gap after transmitting the priority information to the first network; and performing operations in the second network during the at least one gap.

According to an embodiment of the present disclosure, an apparatus configured to operate in a wireless communication system comprises: at least processor; and at least one computer memory operably connectable to the at least one processor, wherein the at least one processor is configured to perform operations comprising: registering to both a first network and a second network; establishing a connection with the first network; transmitting, to the first network, gap information related to one or more gaps requested by the UE and priority information for the one or more gaps, wherein the one or more gaps comprise a time period during which the UE pauses the connection with the first network for performing operations in the second network; receiving, from the first network, a configuration of at least one gap after transmitting the priority information to the first network; and performing operations in the second network during the at least one gap.

According to an embodiment of the present disclosure, a method performed by a network node in a first network configured to operate in a wireless communication system comprises: registering a user equipment (UE) in the first network; establishing a connection with the UE; receiving, from the UE, gap information related to one or more gaps requested by the UE and priority information for the one or more gaps, wherein the one or more gaps comprise a time period during which the UE pauses the connection with the first network for performing operations in a second network to which the UE has registered in addition to the first network; determining at least one gap based on the gap information related to the one or more gaps and the priority information for the one or more gaps; and transmitting, to the UE, a configuration of the at least one gap.

According to an embodiment of the present disclosure, a network node in a first network configured to operate in a wireless communication system comprises: at least one transceiver; at least processor; and at least one computer memory operably connectable to the at least one processor and storing instructions that, based on being executed by the at least one processor, perform operations comprising: registering a user equipment (UE) in the first network; establishing a connection with the UE; receiving, from the UE, gap information related to one or more gaps requested by the UE and priority information for the one or more gaps, wherein the one or more gaps comprise a time period during which the UE pauses the connection with the first network for performing operations in a second network to which the UE has registered in addition to the first network; determining at least one gap based on the gap information related to the one or more gaps and the priority information for the one or more gaps; and transmitting, to the UE, a configuration of the at least one gap.

The present disclosure can have various advantageous effects.

For example, the UE can prevent the inefficient gap configuration regarding the second network operation even when the first network is unable to configure all requested gaps.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
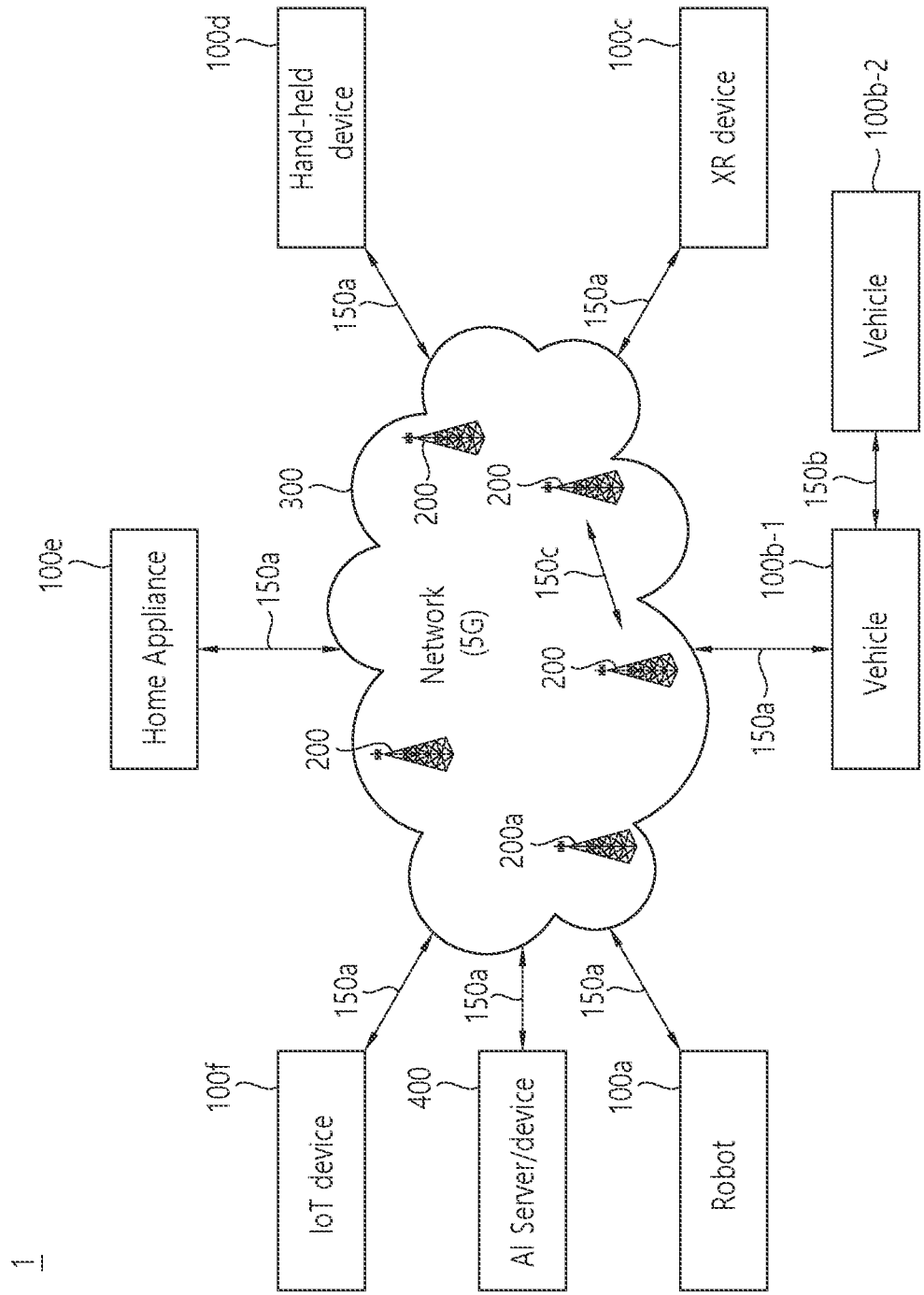
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example. "A/B" may mean "A and/or B". Accordingly, "A/B" may mean "only A", "only B", or "both A and B". For example, "A, B. C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee®, Bluetooth®, and/or LPWAN which take into account low-power communication, and may not be limited to the above-mentioned names. For example, ZigBee® technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
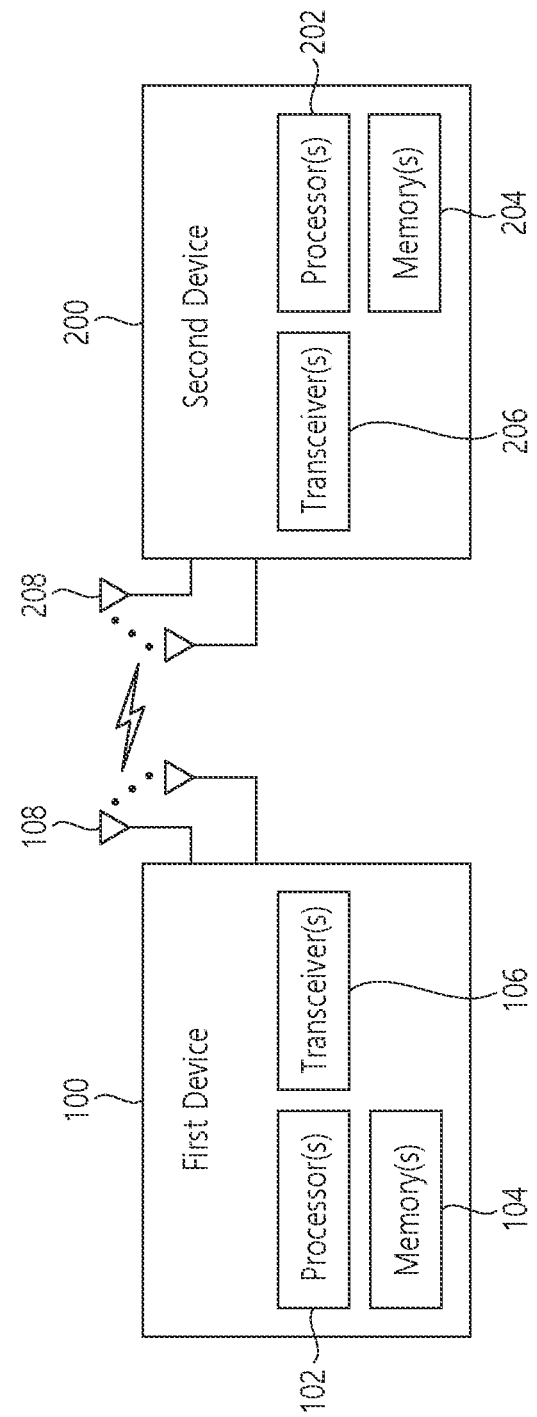
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
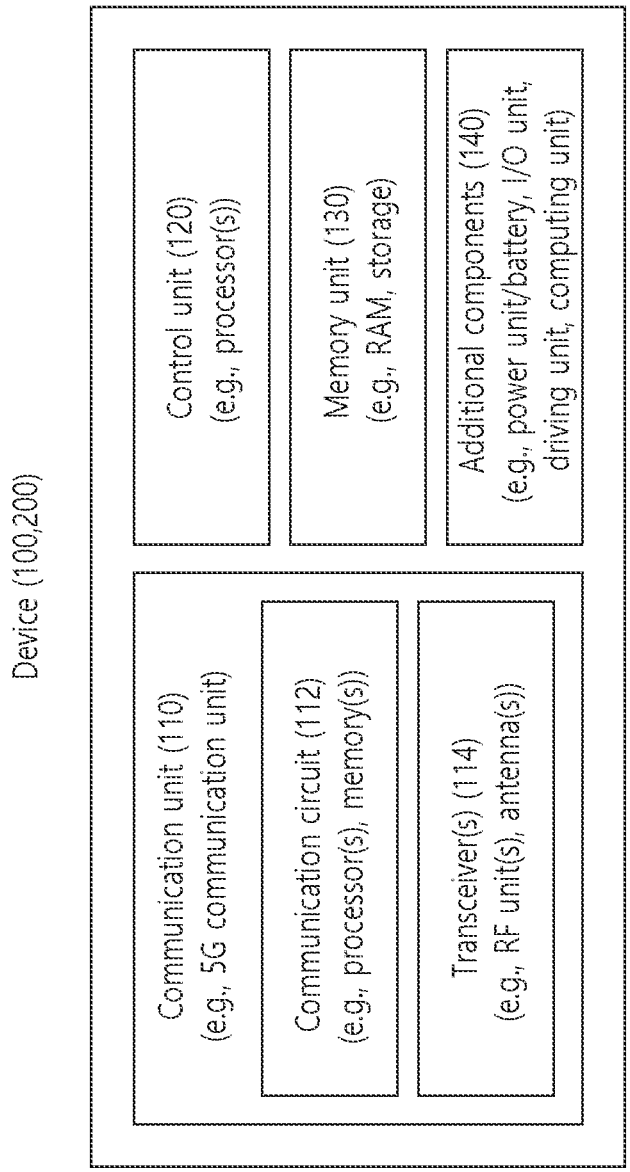
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
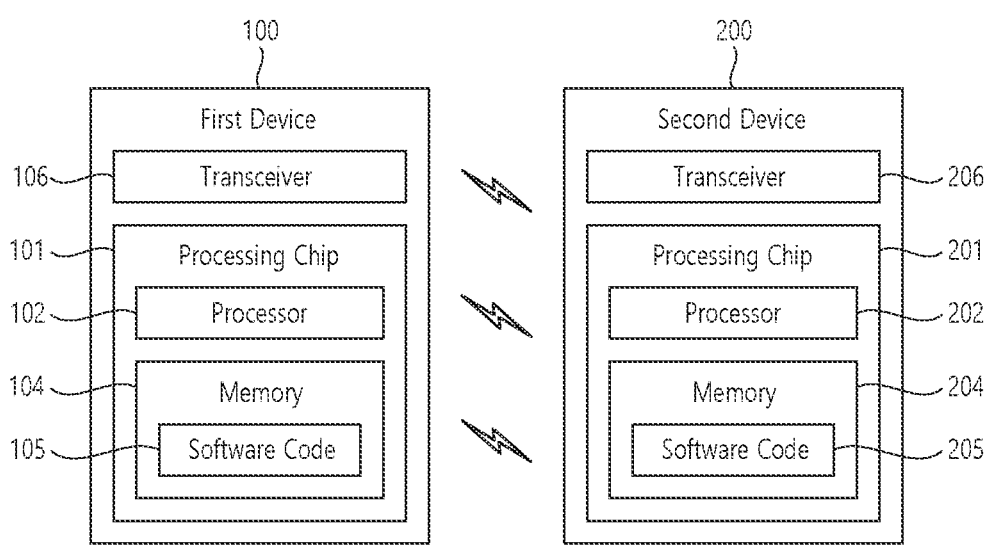
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
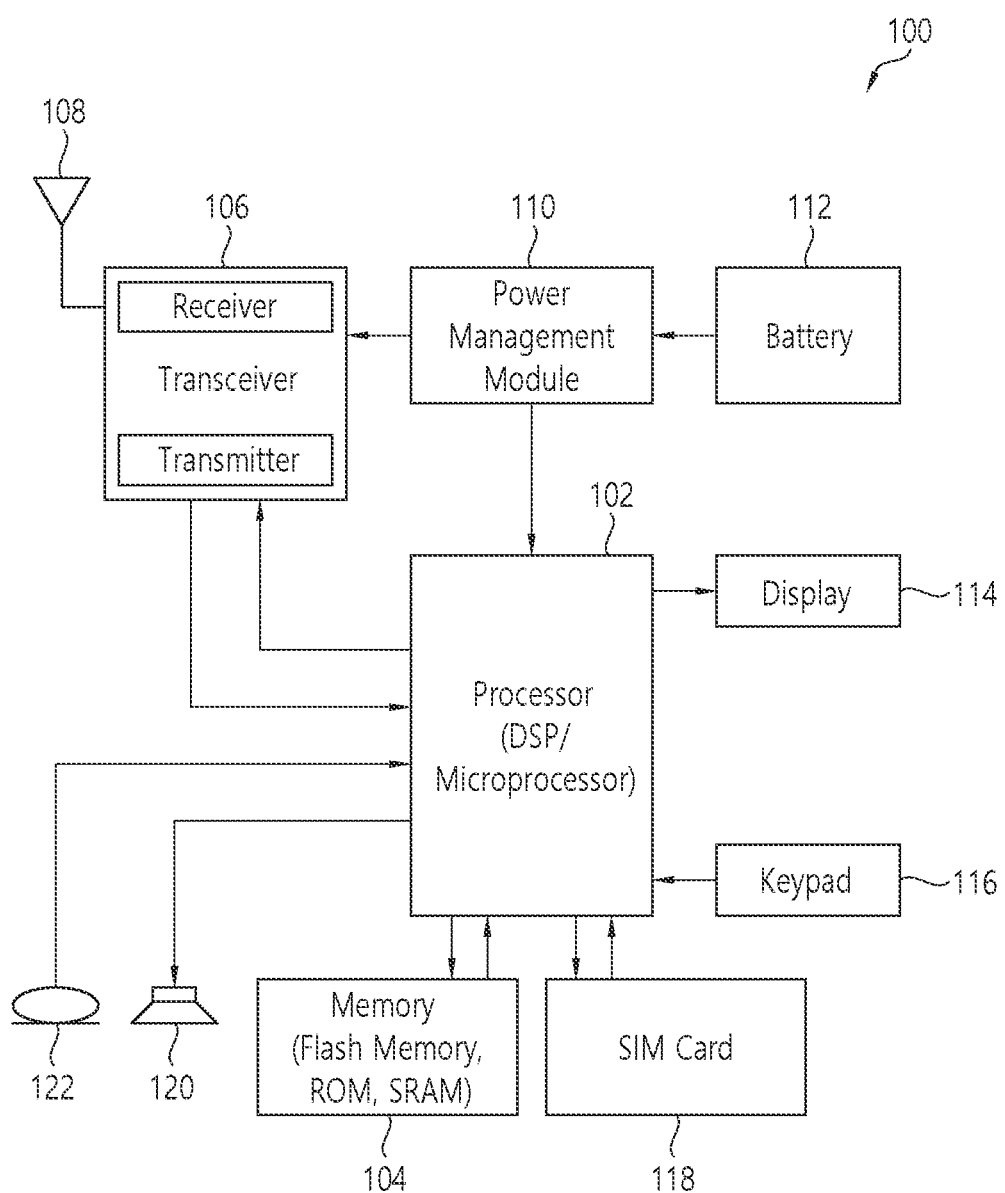
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
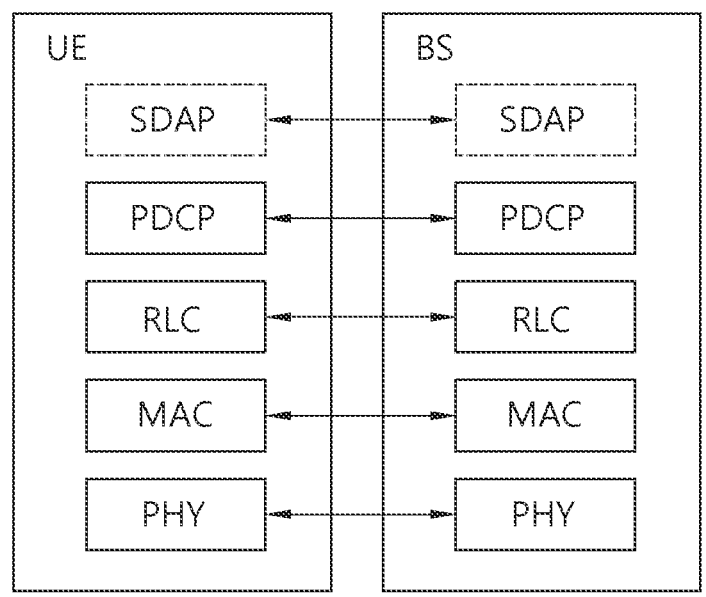
FIGS. 6 and 7 show an example of protocol stacks in a 3GPP based wireless communication system to which implementations of the present disclosure is applied.
Figure 7:
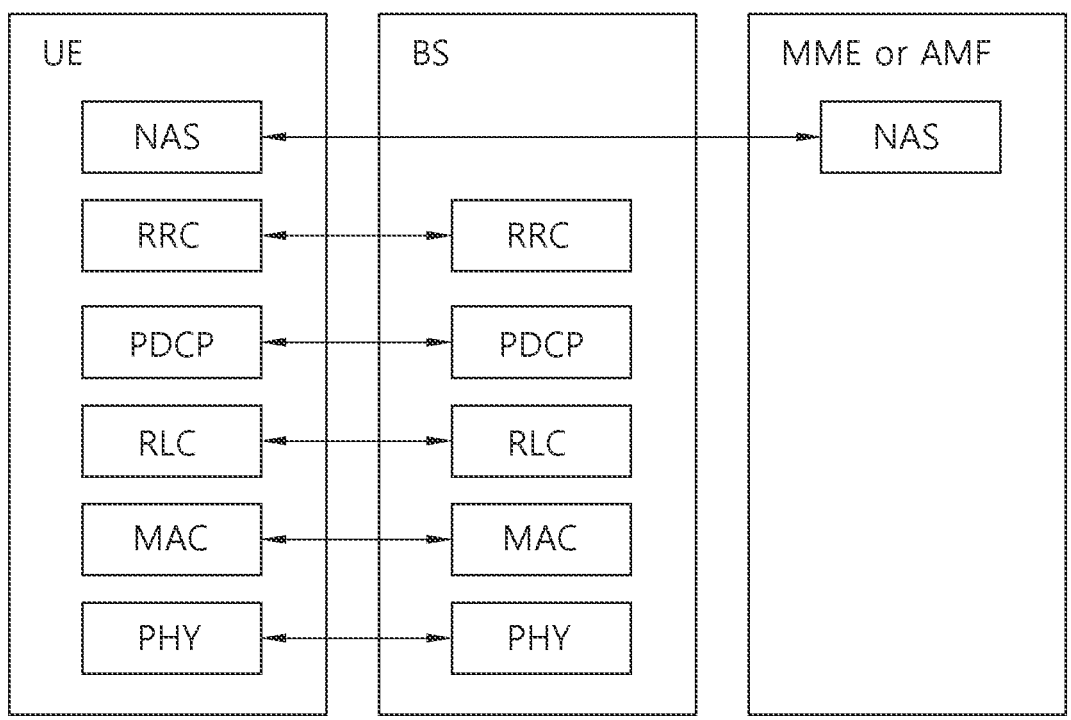

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
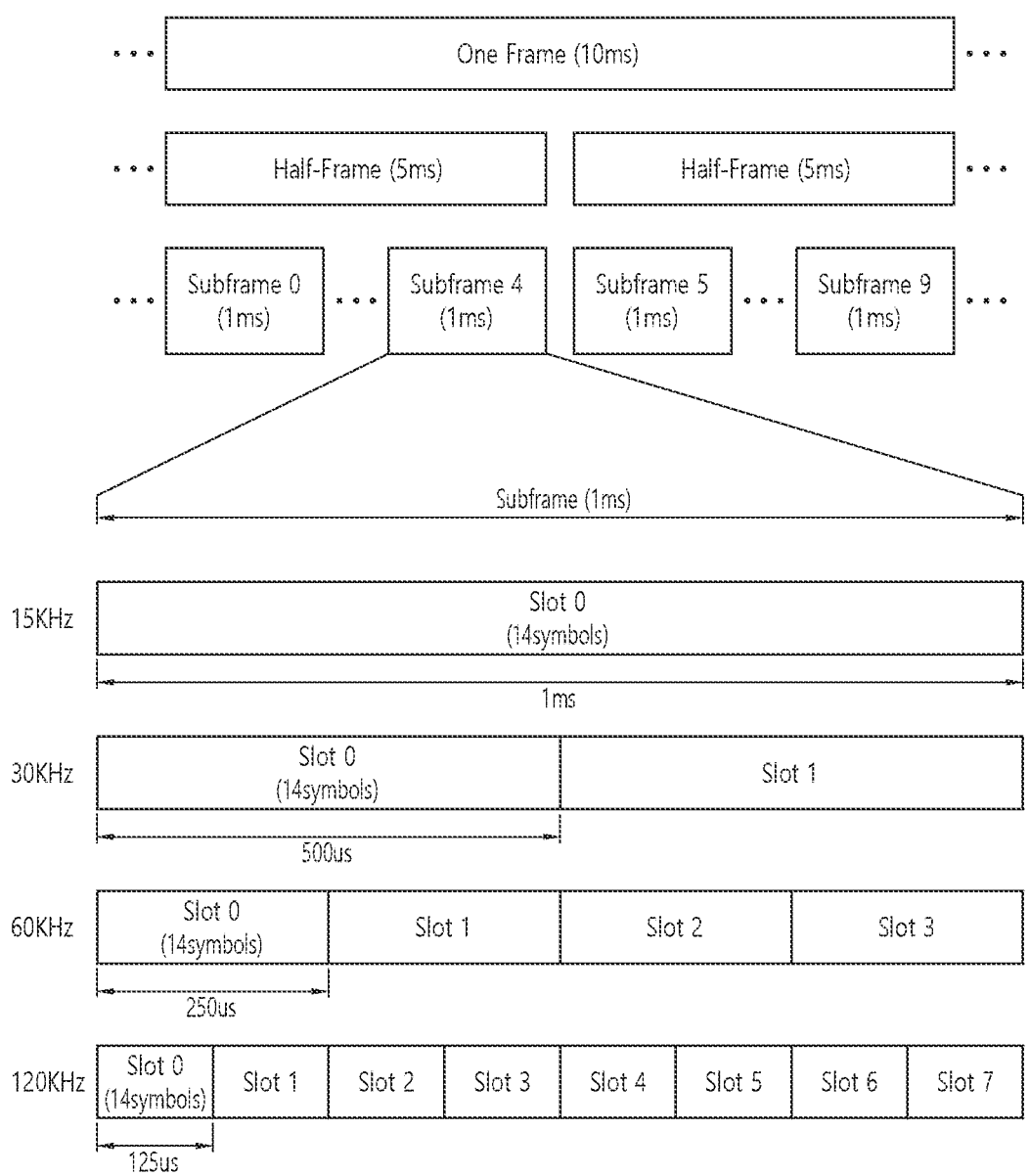
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols). SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N_{symb}^{slot}$ | $N_{slot}^{frame,u}$ | $N_{slot}^{subframe,u}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N_{grid,x}^{size,u} * N_{sc}^{RB}$ subcarriers and $N_{symb}^{subframe,u}$ OFDM symbols is defined, starting at common resource block (CRB) $N_{grid}^{start,u}$ indicated by higher-layer signaling (e.g., RRC signaling), where $N_{grid,x}^{size,u}$ is the number of resource blocks (RBs) in the resource grid and the subscript x is DL for downlink and UL for uplink. $N_{sc}^{RB}$ is the number of subcarriers per RB. In the 3GPP based wireless communication system, $N_{sc}^{RB}$ is 12 generally. There is one resource grid for a given antenna port p, subcarrier spacing configuration u, and transmission direction (DL or UL). The carrier bandwidth $N_{grid}^{size,u}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N_{BWP,i}^{size}-1$, where i is the number of the bandwidth part. The relation between the physical resource block $n_{PRB}$ in the bandwidth part i and the common resource block $n_{CRB}$ is as follows: $n_{PRB}=n_{CRB}+N_{BWP,i}^{size}$, where $N_{BWP,i}^{size}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz | in the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
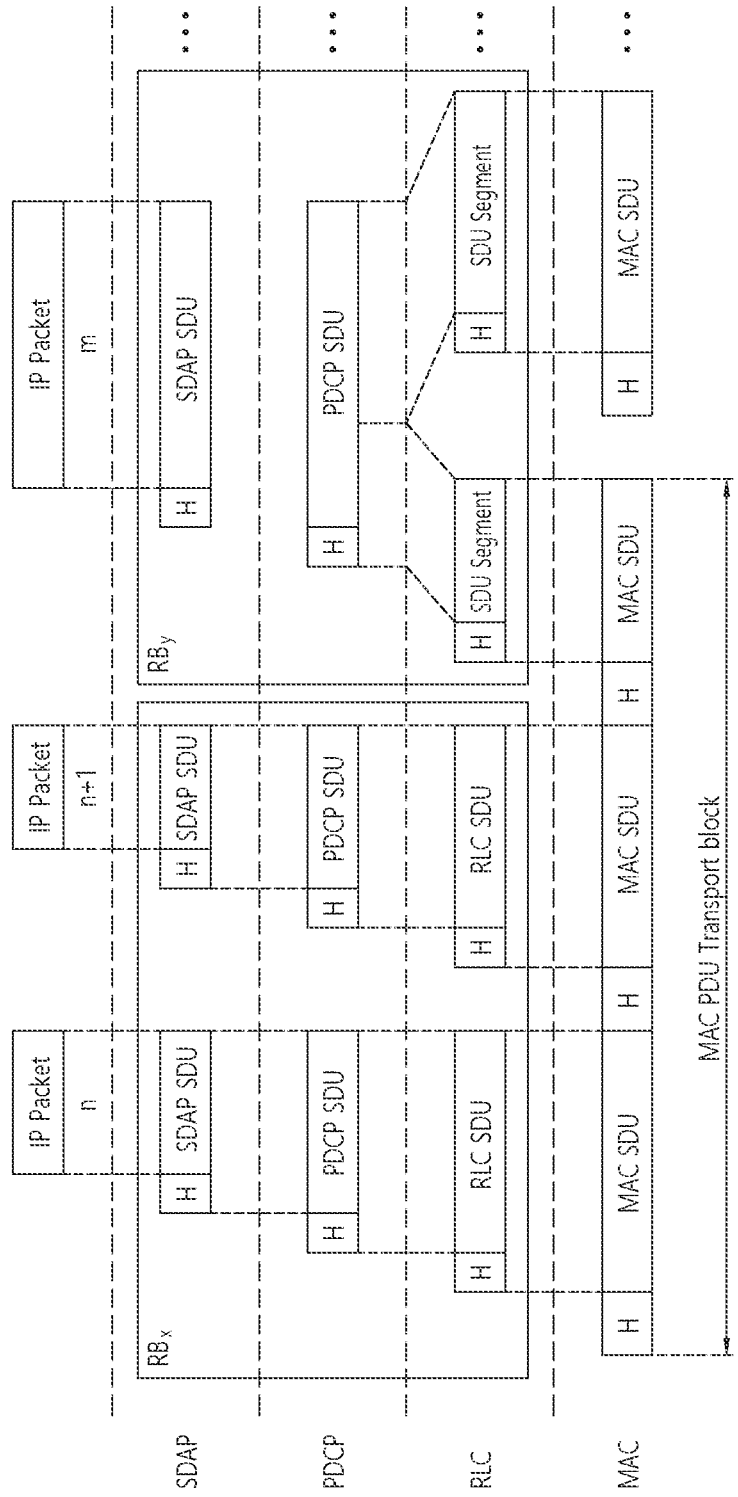
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, contents related to a multi-universal subscriber identity module (MUSIM) is described.

Multi-USIM devices (e.g., MUSIM device 1010) have been more and more popular in different countries. The user may have both a personal and a business subscription in one device or have two personal subscriptions in one device for different services.

Figure 10:
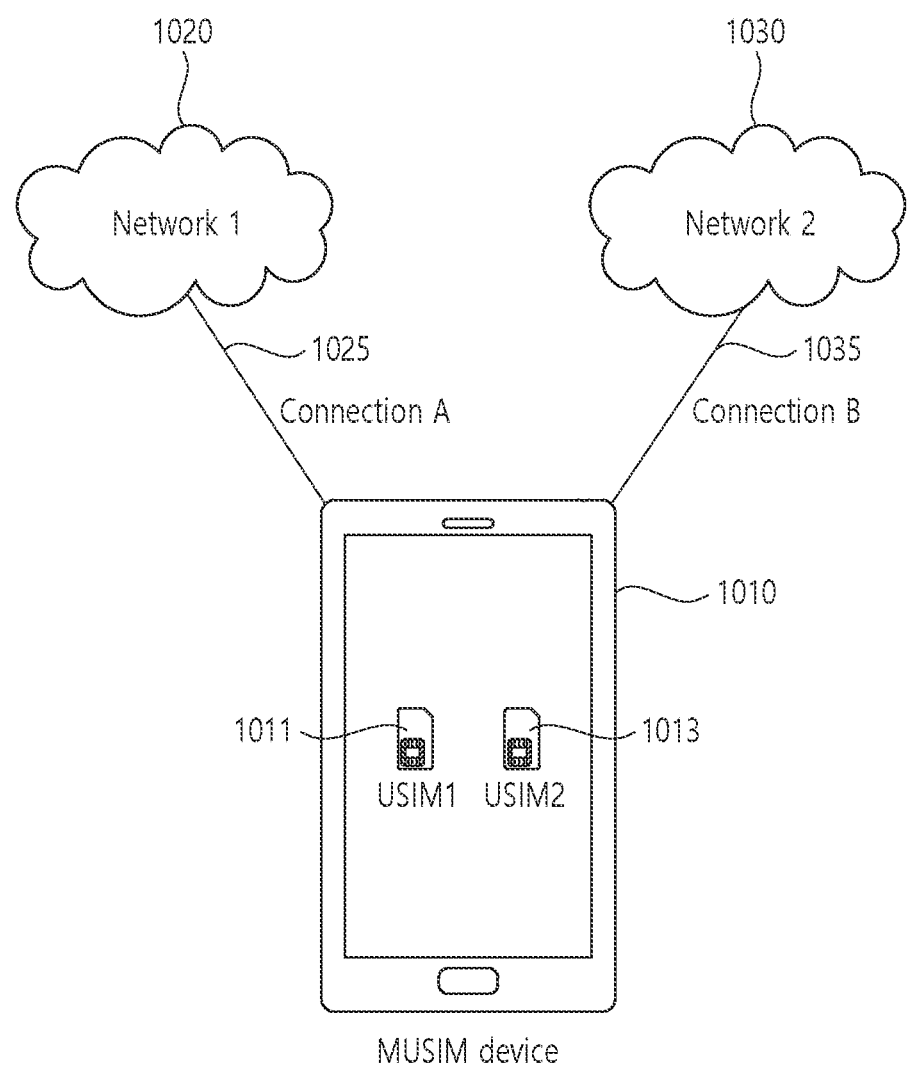
FIG. 10 shows an example of a wireless environment in which a MUSIM device operates according to an embodiment of the present disclosure.

FIG. 10 shows an example of a wireless environment in which a MUSIM device operates according to an embodiment of the present disclosure.

Referring to FIG. 10, MUSIM device 1010 (or, MUSIM UE 1010) may have a plurality of universal subscriber identity modules (USIMs)—USIM1 1011 (or, USIM A 1011) and USIM2 1013 (USIM B 1013). The MUSIM device 1010 may register to a network 1 1020 based on subscription information in the USIM1 1011 to obtain a connection A 1025 between the network 1 1020 and the MUSIM device 1010. The MSUIM device 1010 may also register to a network 2 1030 based on subscription information in the USIM2 1013 to obtain a connection B 1035 between the network 2 1030 and the MUSIM device 1010. The MUSIM device 1010 may use the USIM1 1011 to perform a communication with the network 1 1020 over the connection A 1025, and use the USIM2 1013 to perform a communication with the network 2 1030 over the connection B 1035.

In a wireless environment in which a MUSIM device operates, the following properties may hold:
Each registration from the USIMS of a MUSIM device may be handled independently.

Each registered USIM in the MUSIM device may be associated with a dedicated international mobile equipment identity (IMEI)/permanent equipment identifier (PEI).

A MUSIM UE may be connected with i) evolved packet system (EPS) on one USIM and 5G system (5GS) on the other USIM; ii) EPS on both USIMs; or iii) 5GS on both USIMs.

A MUSIM UE may be a single reception (RX)/dual RX/single transmission (TX)/Dual TX UE. Single RX may allow the MUSIM UE to receive traffic from only one network at one time. Dual RX may allow the MUSIM UE to simultaneously receive traffic from two networks. Single TX may allow the MUSIM UE to transmit traffic to one network at one time. Dual TX may allow the MUSIM UE to simultaneously transmit traffic to two networks. The terms single RX/TX and Dual RX/TX do not refer to a device type. A single UE may, as an example, use Dual TX in some cases but Single TX in other case.

If/when the multiple USIMs in the MUSIM device are served by different serving networks, network coordination between the serving networks may not be required.

A MUSIM device with different USIMs may be camping with all USIMs on the same serving network RAN node, or the MUSIM device may be camping on different serving networks RAN nodes.

USIMs may belong to same or different operators. Coordination between involved operators may not be required.

USIM may be a physical SIM or embedded SIM (eSIM).
NG-RAN may support one or more of the followings for MUSIM device operation:
Paging collision avoidance; and/or
UE notification on network switching.

1. Paging Collision Avoidance

The purpose of the paging collision avoidance is to address the overlap of paging occasions on both USIMs when a MUSIM device (e.g. dual USIM device) is in RRC_IDLE/RRC_INACTIVE state in both the networks (e.g. Network A and Network B) associated with respective USIMs. For example, network A may be NR and network B may be E-UTRA or NR.

A MUSIM device may determine potential paging collision on two networks and may trigger actions to prevent potential paging collision on NR network. The MUSIM device may select one of the two RATs/networks for paging collision avoidance based on implementations of the MUSIM device.

2. UE Notification on Network Switching

For MUSIM operation, a MUSIM device in RRC_CONNECTED state in network A may have to switch from network A to network B. For example, network A may be NR and network B may either be E-UTRA or NR. Before switching from the network A, a MUSIM device should notify the network A to either leave RRC_CONNECTED state, or be kept in RRC_CONNECTED state in the network A while temporarily switching to the network B.

When configured to do so, a MUSIM device can signal the network A a preference to leave RRC_CONNECTED state by using RRC or NAS signaling. After sending a preference to leave RRC_CONNECTED state by using RRC signaling, if the MUSIM device does not receive an RRCRelease message from the network A within a certain time period (configured by the network A), the MUSIM device can enter RRC_IDLE state in network A.

The UE having received otherConfig in RRCReconfiguration shall:
- 1> if the received otherConfig includes the musim-LeaveAssistanceConfig:
- 2> if musim-LeaveAssistanceConfig is set to setup:
- 3> consider itself to be configured to provide MUSIM assistance information for leaving RRC_CONNECTED;
- 2> else:
- 3> consider itself not to be configured to provide MUSIM assistance information for leaving RRC_CONNECTED and stop timer T346g, if running.

The UE may inform the network of its preference to transition out of RRC_CONNECTED state for MUSIM operation by UE assistance information procedure (i.e., by transmitting UEAssistanceInformation message). The UE may initiate the UE assistance information procedure to transmit the UEAssistanceInformation message including MUSIM assistance information for leave indication if the UE was configured to do so upon determining that the UE needs to leave RRC_CONNECTED state.

Upon initiating the UE information procedure, the UE shall:
- 1> if configured to provide MUSIM assistance information for leaving RRC_CONNECTED:
- 2> if the UE needs to leave RRC_CONNECTED state and the timer T346g is not running:
- 3> initiate transmission of the UEAssistanceInformation message to provide MUSIM assistance information for leaving RRC_CONNECTED;
- 3> start the timer T346g with the timer value set to the musim-LeaveWithoutResponseTimer.

The UE shall set the contents of the UEAssistanceInformation message as follows:
- 1> if transmission of the UEAssistanceInformation message is initiated to provide MUSIM assistance information:
- 2> if UE has a preference to leave RRC_CONNECTED state:
- 3> set musim-PreferredRRC-State to the preferred RRC state.

When configured to do so, a MUSIM device can signal the network A a preference to be kept in RRC_CONNECTED state in the network A while temporarily switching to the network B. This is indicated by scheduling gaps preference. This preference can include information for setup or release of gap(s). The network A can configure at most 3 gap patterns for MUSIM purpose: two periodic gaps and a single aperiodic gap.

The UE shall perform the following actions upon reception of the RRCReconfiguration:
- 1> if the RRCReconfiguration message includes the musim-GapConfig:
- 2> for each musim-GapId included in the received musim-GapToReleaseList:
- 3> release the periodic MUSIM gap associated to the musim-GapId;
- 2> for each musim-GapId included in the received musim-GapToAddModList that is part of the current UE configuration:
- 3> reconfigure the entry with the value received for this musim-GapId;
- 2> for each musim-GapId included in the received musim-GapToAddModList that is not part of the current UE configuration:
- 3> add anew entry for this musim-GapId.

The UE having received otherConfig in RRCReconfiguration shall:
- 1> if the received otherConfig includes the musim-GapAssistanceConfig:
- 2> if musim-GapAssistanceConfig is set to setup:
- 3> consider itself to be configured to provide MUSIM assistance information for gap preference;
- 2> else:
- 3> consider itself not to be configured to provide MUSIM assistance information for gap preference and stop timer T346h, if running.

The UE may inform the network of its preference on the MUSIM gaps by UE assistance information procedure (i.e., by transmitting UEAssistanceInformation message). The UE may initiate the UE assistance information procedure to transmit the UEAssistanceInformation message including MUSIM assistance information for gap preference if the UE was configured to do so, upon determining the UE needs the gaps, or upon change of the gap preference information.

Upon initiating the UE information procedure, the UE shall:
- 1> if configured to provide MUSIM assistance information for gap preference:
- 2> if the UE has a preference on the MUSIM gap(s) and the UE did not transmit a UEAssistanceInformation message with musim-GapPreferenceList since it was configured to provide MUSIM assistance information for gap preference; or
- 2> if the current musim-GapPreferenceList is different from the one indicated in the last transmission of the UEAssistanceInformation message including musim-GapPreferenceList and the timer T346h is not running:
- 3> initiate transmission of the UEAssistanceInformation message to provide the current musim-GapPreferenceList;
- 3> start or restart the timer T346h with the timer value set to the musim-GapProhibitTimer.

The UE shall set the contents of the UEAssistanceInformation message as follows:
- 1> if transmission of the UEAssistanceInformation message is initiated to provide MUSIM assistance information:
- 2> if the UE has a preference for MUSIM periodic gap(s):
- 3> include musim-GapPreferenceList with an entry for each periodic gap the UE prefers to be configured;
- 4> set musim-GapLength and musim-GapRepetitionAndOfset in the musim-GapInfo IE to the values of the length and the repetition/offset of the gap(s), respectively, the UE prefers to be configured with:
- 2> if the UE has a preference for MUSIM aperiodic gap:
- 3> include the field musim-GapPreferenceList, with one entry for the aperiodic gap the UE prefers to be configured;
- 4> set musim-GapLength and musim-Starting-SFN-And-Subframe in the musim-GapInfo IE to the values of the length and the starting SFN/subframe of the gap, respectively, the UE prefers to be configured with:
- 2> if the UE has no longer preference for the periodic/aperiodic gaps:
- 3> do not include musim-GapPreferenceList in the musim-Assistance IE.

If/when the MUSIM device is configured with a scheduling gap (i.e., MUSIM gap) from the network A, the MUSIM device may perform at least one of the following operations during the scheduling gap:

the MUSIM device maintains a RRC_CONNECTED state in the network A (i.e., maintains a connection with the network A);

the MUSIM device stops monitoring a paging from the network A and/or the network A does not schedule or allocate resources to the MUSIM device;

the MUSIM device monitors a paging from the network B;

if the MUSIM device receives a paging from the network B, the MUSIM device establishes a connection with the network B (i.e., enters an RRC_CONNECTED state in the network B), and performs operations (e.g., data transmission/reception) in the network B.

the MUSIM device performs a measurement on the network B; and/or the MUSIM device performs system information (SI) acquisition from the network B.

When the MUSIM device completes the operations in the network B and/or the scheduling gap ends, the MUSIM device may release the connection with the network B (i.e., enters RRC_IDLE/INACTIVE in the network B), and revert back to the network A (i.e., resume monitoring a paging from the network A).

Meanwhile, a multi-USIM device (i.e., MUSIM UE) may have concurrent registrations associated with several USIMs. While actively communicating with the system/network associated with a current USIM (e.g., current system and/or first system/network), the MUSIM UE may determine that it needs to perform some activity (e.g., respond to a page/paging, or perform mobility update) in the other system/network associated with other USIM(s) (e.g., the second system/network(s)).

To support activities in the second system/network associated with other USIM, a gap-based procedure i.e., AS gap-based leaving and return may be performed. If the first network scheduled MUSIM gap for SIM/USIM switching, the UE may autonomously pause RRC connection on the current USIM and perform MUSIM operation on the other USIM. MUSIM UE can be configured with the multiple gaps that have varied gap duration and repetition period. If the first network cannot configure all MUSIM gaps requested by the UE, the network may select arbitrary gaps among candidates to configure to the UE.

However, insufficient gap configuration may cause operation inefficiency of MUSIM UE at second network. It is because first network does not consider the gap candidate preference of UE, which is originated from the absence of gap candidate priority.

Therefore, a way should be needed to resolve this problem to send the MUSIM gap priority of UE for multiple MUSIM gap requests.

Figure 11:
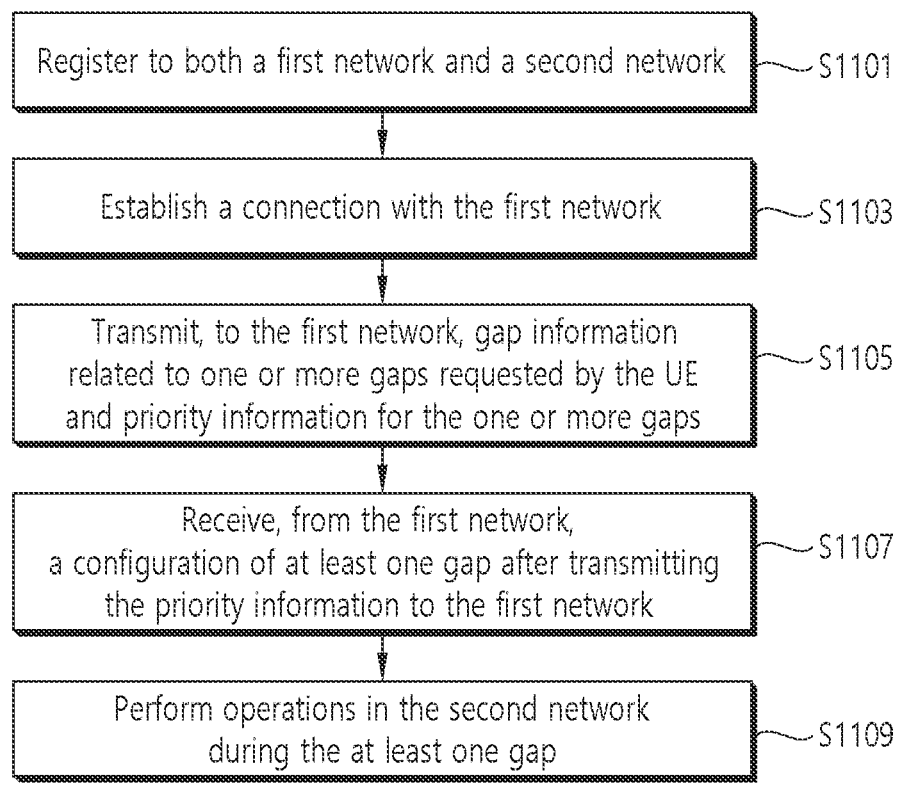
FIG. 11 shows an example of a method performed by a UE according to an embodiment of the present disclosure.

FIG. 11 shows an example of a method performed by a UE according to an embodiment of the present disclosure. The method may also be performed by a wireless device.

Referring to FIG. 11, in step S1101, the UE may register to both a first network and a second network.

In step S1103, the UE may establish a connection with the first network.

In step S1105, the UE may transmit, to the first network, gap information related to one or more gaps requested by the UE and priority information for the one or more gaps. The one or more gaps may comprise a time period during which the UE pauses the connection with the first network for performing operations in the second network In step S1107, the UE may receive, from the first network, a configuration of at least one gap after transmitting the priority information to the first network.

In step S1109, the UE may perform operations in the second network during the at least one gap.

According to various embodiments, the pausing of the connection with the first network may comprise at least one of: stopping monitoring a paging from the first network while in a connected state for the first network; monitoring a paging from the second network; or establishing a connection with the second network and performing operations in the second network after receiving the paging from the second network.

According to various embodiments, the gap information may comprise a list of gap information related to each gap. The gap information related to each gap may comprise at least one of a gap pattern for a corresponding gap, or a gap time offset for the corresponding gap.

According to various embodiments, the gap pattern for the corresponding gap may comprise at least one of a length of the corresponding gap, a periodicity of the corresponding gap or a pattern of the corresponding gap represented by indicators or a bitmap in the length or the periodicity. The gap time offset for the corresponding gap may comprise an offset of a time point the gap pattern starts with respect to a reference time point.

According to various embodiments, priority information for each gap may be informed by an order of gap information related to the corresponding gap in the list with a highest priority ordered first in the list.

According to various embodiments, the gap information related to each gap may further comprise priority information for the corresponding gap.

According to various embodiments, the priority information for the one or more gaps may comprise at least one of a priority value or a priority level of the one or more gaps. The priority value increases as the priority level decreases.

According to various embodiments, the UE may transmit, to the first network, purpose information of each gap. The purpose information of each gap may comprise at least one of a measurement on the second network during a corresponding gap, a paging reception from the second network during the corresponding gap, a system information (SI) acquisition from the second network during the corresponding gap or a connection establishment with the second network during the corresponding gap.

According to various embodiments, the UE may transmit, to the first network, type information of each gap. The type information of each gap may comprise at least one of a periodic gap or an aperiodic gap.

According to various embodiments, the UE may transmit, to the first network, preference information that one of the periodic gap and the aperiodic gap is more preferred than the other one.

According to various embodiments, the UE may receive, from the first network, a configuration for a maximum number of the one or more gaps. The maximum number may be 3, and the one or more gaps may comprise 2 period gaps and 1 aperiodic gap.

According to various embodiments, the UE may be a multi-universal subscriber identity module (MUSIM) UE including a first USIM and a second USIM. The UE may register to the first network based on subscription information in the first USIM. The UE may register to the second network based on subscription information in the second USIM.

According to various embodiments, the UE may register to both a first network and a second network. The UE may construct a gap request including priority information of each gap of at least two requested gaps. The UE may transmit the gap request to the first network. The UE may receive one or multiple gaps from the network. The UE may perform operations in the second network during the received gaps.

Furthermore, the method in perspective of the UE described above in FIG. 11 may be performed by first wireless device 100 shown in FIG. 2, the wireless device 100 shown in FIG. 3, the first wireless device 100 shown in FIG. 4 and/or the UE 100 shown in FIG. 5.

More specifically, the UE may comprise at least one transceiver, at least processor, and at least one computer memory operably connectable to the at least one processor and storing instructions that, based on being executed by the at least one processor, perform operations.

The operations may comprise: registering to both a first network and a second network; establishing a connection with the first network; transmitting, to the first network, gap information related to one or more gaps requested by the UE and priority information for the one or more gaps,—the one or more gaps comprising a time period during which the UE pauses the connection with the first network for performing operations in the second network; receiving, from the first network, a configuration of at least one gap after transmitting the priority information to the first network; and performing operations in the second network during the at least one gap.

Furthermore, the method in perspective of the UE described above in FIG. 11 may be performed by a software code 105 stored in the memory 104 included in the first wireless device 100 shown in FIG. 4.

More specifically, at least one computer readable medium (CRM) stores instructions that, based on being executed by at least one processor, perform operations comprising: registering to both a first network and a second network; establishing a connection with the first network; transmitting, to the first network, gap information related to one or more gaps requested by the UE and priority information for the one or more gaps,—the one or more gaps comprising a time period during which the UE pauses the connection with the first network for performing operations in the second network; receiving, from the first network, a configuration of at least one gap after transmitting the priority information to the first network; and performing operations in the second network during the at least one gap.

Furthermore, the method in perspective of the UE described above in FIG. 11 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., wireless device/ UE) comprises at least processor, and at least one computer memory operably connectable to the at least one processor. The at least one processor is configured to perform operations comprising: registering to both a first network and a second network; establishing a connection with the first network; transmitting, to the first network, gap information related to one or more gaps requested by the UE and priority information for the one or more gaps,—the one or more gaps comprising a time period during which the UE pauses the connection with the first network for performing operations in the second network; receiving, from the first network, a configuration of at least one gap after transmitting the priority information to the first network; and performing operations in the second network during the at least one gap.

Figure 12:
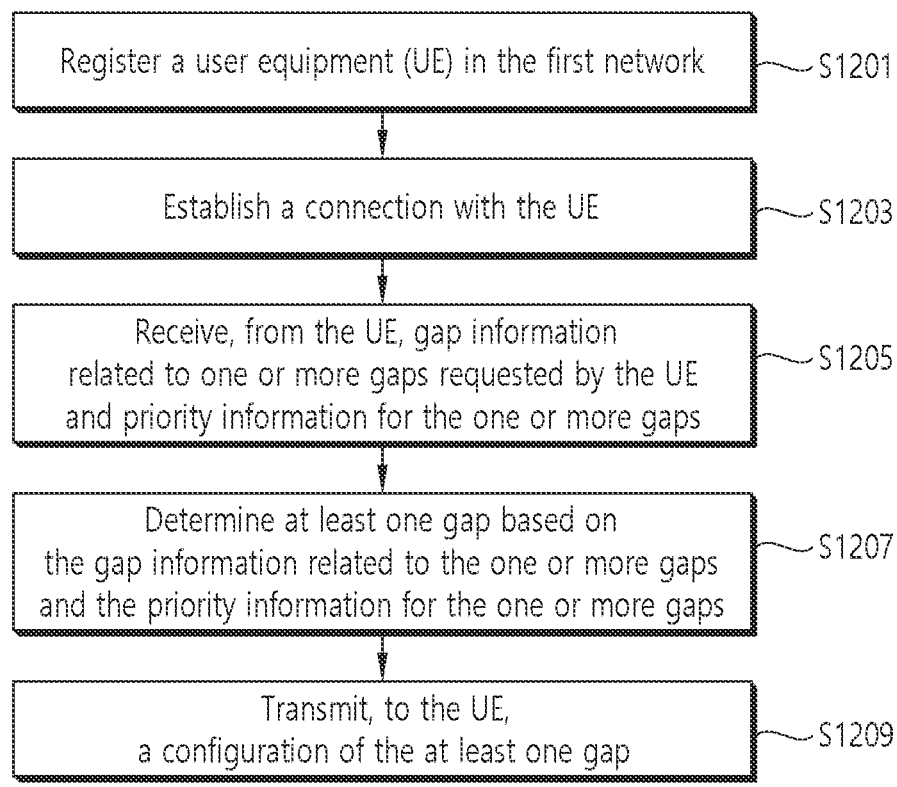
FIG. 12 shows an example of a method performed by a network node in a first network according to an embodiment of the present disclosure.

FIG. 12 shows an example of a method performed by a network node in a first network according to an embodiment of the present disclosure.

Referring to FIG. 12, in step S1201, the network node may register a UE in the first network.

In step S1203, the network node may establish a connection with the UE.

In step S1205, the network node may receive, from the UE, gap information related to one or more gaps requested by the UE and priority information for the one or more gaps. The one or more gaps may comprise a time period during which the UE pauses the connection with the first network for performing operations in a second network to which the UE has registered in addition to the first network.

In step S1207, the network node may determine at least one gap based on the gap information related to the one or more gaps and the priority information for the one or more gaps.

In step S1209, the network node may transmit, to the UE, a configuration of the at least one gap.

Furthermore, the method in perspective of the network node described in FIG. 12 may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: registering a UE in the first network; establishing a connection with the UE; receiving, from the UE, gap information related to one or more gaps requested by the UE and priority information for the one or more gaps—the one or more gaps comprising a time period during which the UE pauses the connection with the first network for performing operations in a second network to which the UE has registered in addition to the first network; determining at least one gap based on the gap information related to the one or more gaps and the priority information for the one or more gaps; and transmitting, to the UE, a configuration of the at least one gap.

Figure 13:
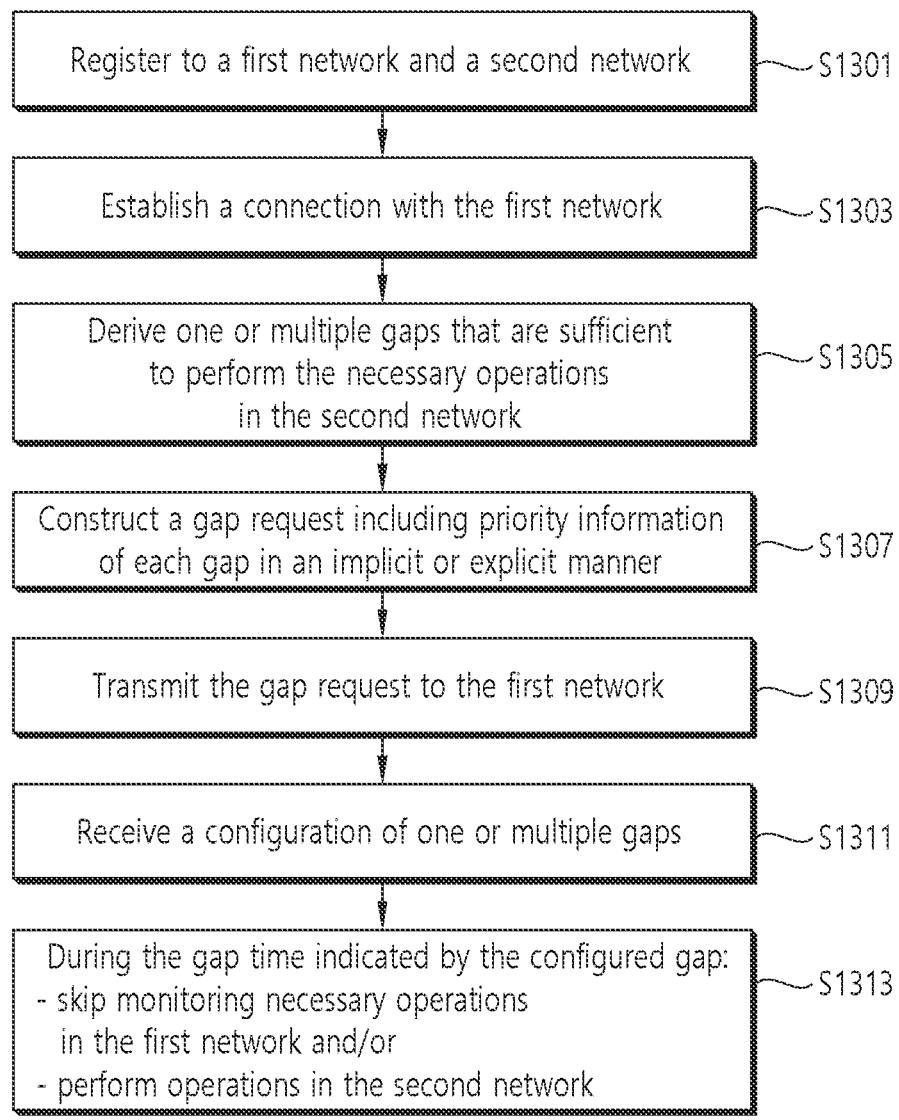
FIG. 13 shows an example of a method for indicating priority among candidate MUSIM gaps according to an embodiment of the present disclosure.

FIG. 13 shows an example of a method for indicating priority among candidate MUSIM gaps according to an embodiment of the present disclosure. The method may be performed by a wireless device and/or a UE (e.g., MUSIM UE).

According to implementations of the present disclosure, while registering to a first and a second network, the UE may derive two or more gaps that are possibly required to perform necessary operations in the second network and construct a gap request that provides priority information of each gap of at least two requested gaps. Then the UE may transmit the gap request to the first network so that the first network can choose and configure one or more optimal gaps to the UE based on the indicted gaps and their priorities as well as network's preference.

Referring to FIG. 13, in step S1301, the UE may register to a first network and a second network.

In step S1303, the UE may establish a connection with the first network. The UE may be connected to the first network and/or in RRC_CONNECTED for the first network. The UE may be in RRC_IDLE or RRC_INACTIVE, or RRC_CONNECTED in the second network.

The UE may detect that one or more time gaps (i.e., scheduling gap) are required to operate necessary operations in the second network, where the necessary operations may comprise at least one of reception of paging messages, measurements, SI acquisition, or connection establishment which involves reception of signals from the second network and/or transmission of signals to the second network.

In step S1305, the UE may derive one or multiple gaps that are sufficient to perform the necessary operations in the second network.

In step S1307, the UE may construct a gap request including priority information of each gap in an implicit or explicit manner. The gap request may include a list of gap candidates where the order of list indicates a priority of each gap implicitly, or the priority information may include a priority indicator explicitly for each gap.

According to an embodiment, for implicit indication of priority information, an ordered gap list may be constructed based on the priority of each gap. That is, priority information for each gap may be indicated by an order of gap information related to the corresponding gap in the list with a highest priority ordered first in the list.

For example, if there are three gap candidates having the priority as Gap1>Gap2>Gap3 (gap1 has a higher priority than gap2, and gap2 has a higher priority than gap3), the gap request list may be constructed as the following table 5:

TABLE 5

Gap request list :=
  Gap1
    Gap1 information
      gap pattern, gap time offset
  Gap2
    Gap1 information
      gap pattern, gap time offset
  Gap3
    Gap3 information
      gap pattern, gap time offset In table 5, gap information of each gap may comprise a gap pattern and a gap time offset for the concerned gap.

According to an embodiment, for explicit indication of priority information, the gap request list may contain an explicit priority indicator for each gap. That is, gap information related to each gap may comprise priority information for the corresponding gap. For example, if there are three gap candidates having the priority as Gap1>Gap2>Gap3, the gap request list may be constructed as the following table 6:

TABLE 6

Gap request list :=
  Gap1
    Gap1 information
      gap pattern, gap time offset, gap priority
  Gap2
    Gap1 information
      gap pattern, gap time offset, gap priority
  Gap3
    Gap3 information
      gap pattern, gap time offset, gap priority In table 6, gap information of each gap may comprise a gap pattern, a gap time offset and a gap priority for the concerned gap. The gap priority may comprise at least one of a priority value or a priority level of the concerned gap, where an increasing priority value indicates a lower priority level.

According to various embodiments, the gap pattern may comprise a length of the gap and indicators or a bitmap representing the pattern of the gap within the indicated length. For another example, the gap pattern may comprise at least one of a gap duration or a gap repetition period. The gap time offset may indicate when the gap pattern starts with reference to a specific point (e.g., a specific subframe/timeslot e.g., (slot #0 or subframe #0) at specific SFN (e.g., SFN #0)).

According to an embodiment, the gap request may further include usage information of each requested gap. For example, the usage information may indicate at least one of "measurement", "paging reception", "SI acquisition" and/or "connection establishment".

According to an embodiment, the gap request may further include a type of the requested gap. For example, the type may comprise at least one of "periodic gap" or "aperiodic gap (or one-shot gap)".

According to an embodiment, the gap request may further include priority between gap types such that one of the periodic gap and the aperiodic gap is more preferred than the other one. For example, the priority between gap types may comprise information indicating that aperiodic gap has a higher priority than a periodic gap. For another example, the priority between gap types may comprise information indicating that a periodic gap has a higher priority than aperiodic gap According to an embodiment, the first network may configure the UE with the maximum number of gaps to be requested to. The maximum number may be predefined (e.g., 3). If the maximum number of gaps is configured, the UE may include gap(s) derived by the UE up to the indicated maximum number.

In step S1309, the UE may transmit the gap request to the first network. The gap request may be included in a UEAssistanceInformation message or another message dedicated to multi-SIM operations.

In step S1311, the UE may be configured with one or multiple gaps by the first network. The configured gap may be chosen by the first network based on both UE's preference and network's preference. That is, the first network may configured the gap based on both UE's preference and network's preference.

In step S1313, during the gap time indicated by the configured gap, the UE is allowed to skip monitoring necessary operations in the first network (e.g., the UE may skip PDCCH monitoring, CSI/SSB measurements, RRM measurements, RLM measurements, UL transmission (CSI reporting, SRS transmission)), and/or the UE can perform operations in the second network during the gap time.

According to an embodiment, if the UE's preferred priority of the requested gap changes, the UE may reconstruct a gap request including the new priority information and send the gap request to the network.

The present disclosure can have various advantageous effects.

For example, the UE can prevent the inefficient gap configuration regarding the second network operation even when the first network is unable to configure all requested gaps.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
registering to both a first network and a second network;
establishing a connection with the first network;
transmitting, to the first network, a first user equipment (UE) assistance information message,
wherein the first UE assistance information message includes gap information related to one or more gaps requested by a UE and priority information related to the one or more gaps,
wherein the UE pauses the connection with the first network for performing operations in the second network in the one or more gaps;
receiving, from the first network, a configuration of at least one gap;
performing operations in the second network during the at least one gap; and
based on current priority information related to the one or more gaps being different from the priority information included in the first UE assistance information message, transmitting a second UE assistance information message including the current priority information to the first network,
wherein the gap information comprises a list of gap information related to each gap, and
wherein the gap information related to each gap comprises a gap length for a corresponding gap, and a gap time offset for the corresponding gap.

2. The method of claim 1, wherein the pausing of the connection with the first network comprises at least one of:
stopping monitoring a paging from the first network while in a connected state for the first network;
monitoring a paging from the second network; or
establishing a connection with the second network and performing operations in the second network after receiving the paging from the second network.

3. The method of claim 1, wherein priority information for each gap is informed by an order of gap information related to the corresponding gap in the list with a highest priority ordered first in the list.

4. The method of claim 1, wherein the gap information related to each gap further comprises priority information for the corresponding gap.

5. The method of claim 1, wherein the priority information for the one or more gaps comprises at least one of a priority value or a priority level of the one or more gaps, and
wherein the priority value increases as the priority level decreases.

6. The method of claim 1, further comprising:
transmitting, to the first network, purpose information of each gap,
wherein the purpose information of each gap comprises at least one of a measurement on the second network during a corresponding gap, a paging reception from the second network during the corresponding gap, a system information (SI) acquisition from the second network during the corresponding gap or a connection establishment with the second network during the corresponding gap.

7. The method of claim 1, further comprising:
transmitting, to the first network, type information of each gap,
wherein the type information of each gap comprises at least one of a periodic gap or an aperiodic gap.

8. The method of claim 7, further comprising:
transmitting, to the first network, preference information that one of the periodic gap and the aperiodic gap is more preferred than the other one.

9. The method of claim 1, further comprising:
receiving, from the first network, a configuration for a maximum number of the one or more gaps,
wherein the maximum number is 3, and
wherein the one or more gaps comprise 2 period gaps and 1 aperiodic gap.

10. The method of claim 9, wherein the UE is a multi-universal subscriber identity module (MUSIM) UE including a first USIM and a second USIM,
wherein the registering to both the first network and the second network comprises:
registering to the first network based on subscription information in the first USIM; and
registering to the second network based on subscription information in the second USIM.

11. The method of claim 1, wherein the UE is in communication with at least one of a mobile device, a network, or autonomous vehicles other than the UE.

12. A user equipment (UE) comprising:
at least one transceiver;
at least one processor; and
at least one computer memory operably connectable to the at least one processor and storing instructions that, based on being executed by the at least one processor, perform operations comprising:
registering to both a first network and a second network;
establishing a connection with the first network;
transmitting, to the first network, a first user equipment (UE) assistance information message,
wherein the first UE assistance information message includes gap information related to one or more gaps requested by the UE and priority information related to the one or more gaps,
wherein the UE pauses the connection with the first network for performing operations in the second network in the one or more gaps;
receiving, from the first network, a configuration of at least one gap;
performing operations in the second network during the at least one gap; and
based on current priority information related to the one or more gaps being different from the priority information included in the first UE assistance information message, transmitting a second UE assistance information message including the current priority information to the first network,
wherein the gap information comprises a list of gap information related to each gap, and wherein the gap information related to each gap comprises a gap length for a corresponding gap, and a gap time offset for the corresponding gap.

13. A network node in a first network comprising:
at least one transceiver;
at least one processor; and
at least one computer memory operably connectable to the at least one processor and storing instructions that, based on being executed by the at least one processor, perform operations comprising:
registering a user equipment (UE) in the first network;
establishing a connection with the UE;
receiving, from the UE, a first user equipment (UE) assistance information message,
wherein the first UE assistance information message includes gap information related to one or more gaps requested by the UE and priority information related to the one or more gaps,
wherein the UE pauses the connection with the first network for performing operations in a second network to which the UE has registered in addition to the first network in the one or more gaps;
determining at least one gap based on the gap information related to the one or more gaps and the priority information for the one or more gaps;
transmitting, to the UE, a configuration of the at least one gap; and
based on current priority information related to the one or more gaps being different from the priority information included in the first UE assistance information message, receiving a second UE assistance information message including the current priority information from the UE,
wherein the gap information comprises a list of gap information related to each gap, and
wherein the gap information related to each gap comprises a gap length for a corresponding gap, and a gap time offset for the corresponding gap.

* * * * *